May 8, 1934. F. L. SZAFRANSKI ET AL 1,957,739
AIRPLANE CONTROL SIDE PROPELLER MECHANISM
Filed April 28, 1933  4 Sheets-Sheet 1
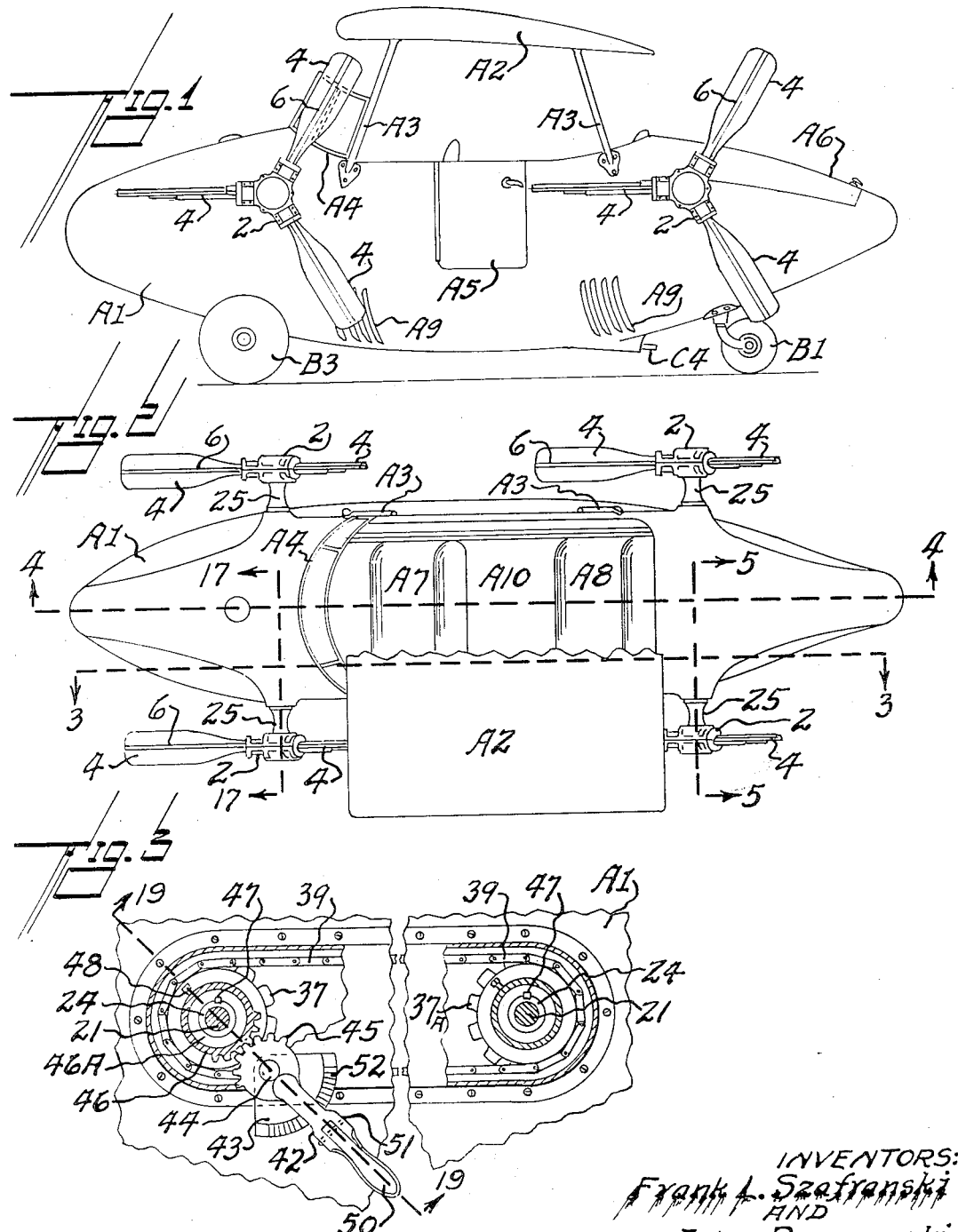

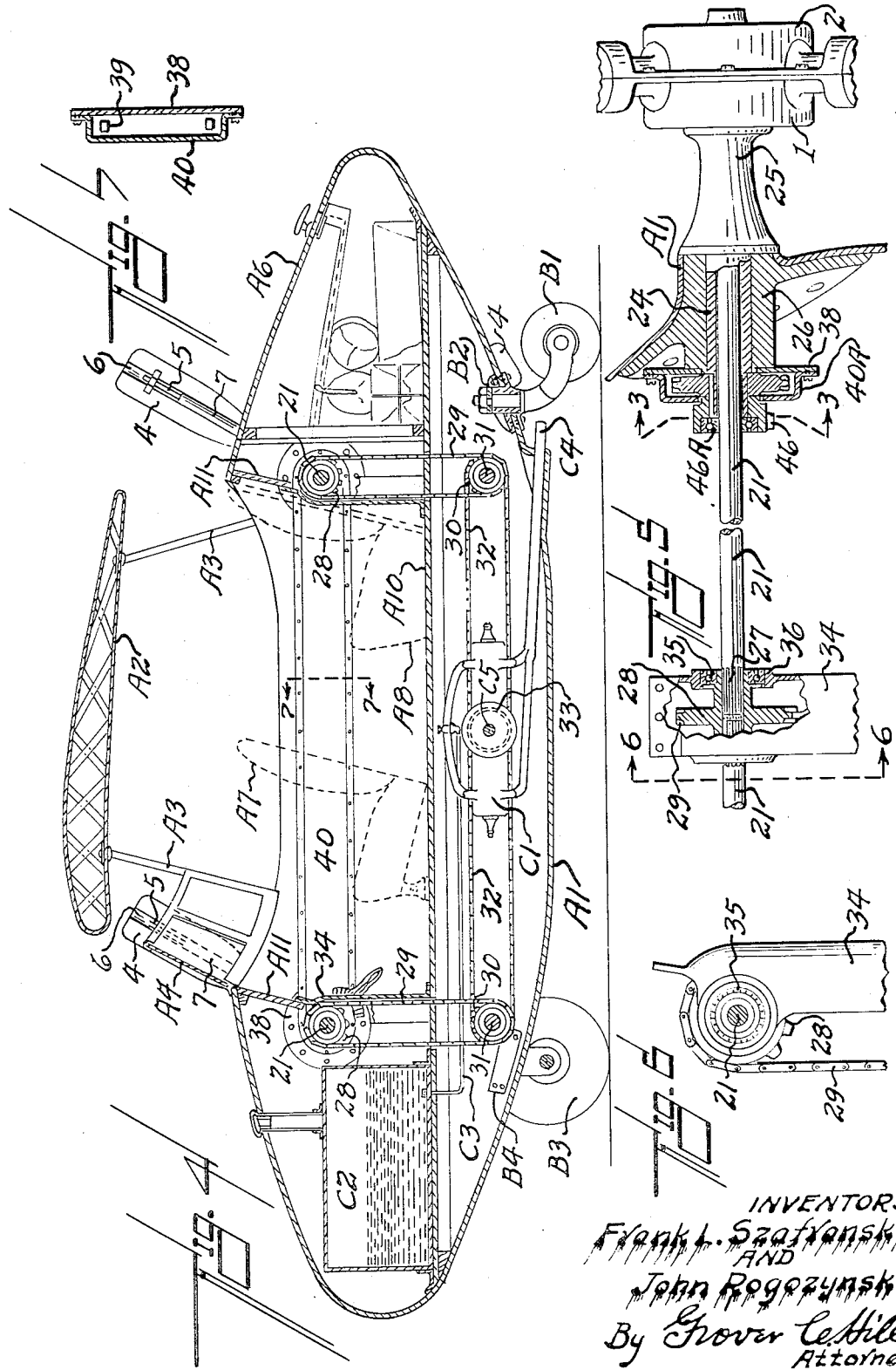

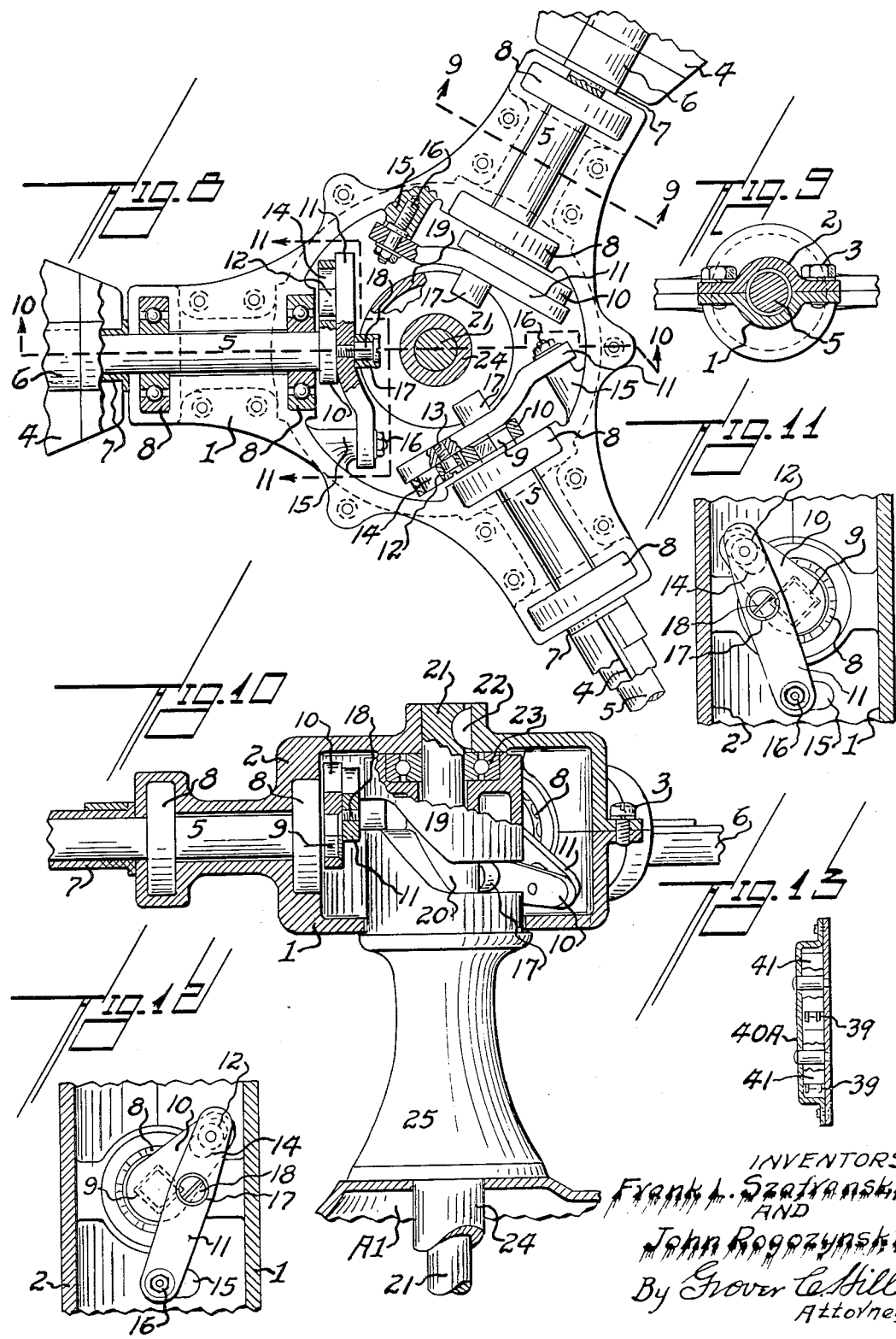

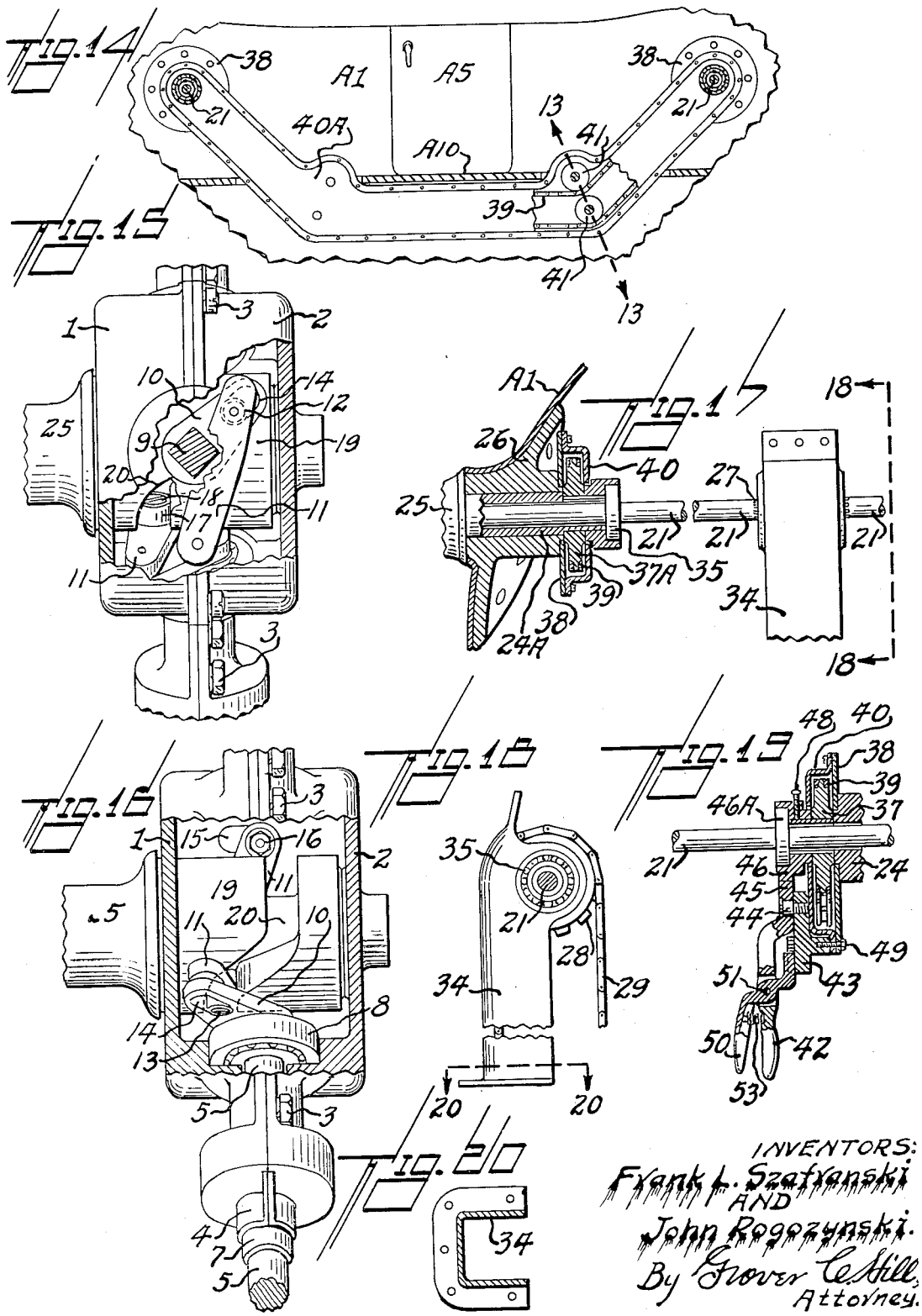

Patented May 8, 1934

1,957,739

UNITED STATES PATENT OFFICE 1,957,739

AIRPLANE CONTROL SIDE PROPELLER MECHANISM

Frank L. Szafranski and John Rogozynski, Detroit, Mich.

Application April 28, 1933, Serial No. 668,320

9 Claims. (Cl. 170—154)

The outstanding advantage of our invention is that the discovery thereof presents an entire new era and principle in the great and important industry of aeronautical design, engineering and construction.

A further object of the discovery is to provide an airplane with a plurality of propellers upon each side thereof and in vertical relation thereto and within the hub of each propeller a specially designed mechanism is arranged. Within the body a control mechanism is designed to accommodate the propellers upon each side respectively. Unlike the customary propeller with the blades thereof being integral with the propeller shaft, each propeller of this invention is arranged with rotatable blades relative to the propeller shaft. In this manner the airplane is manipulated by the interior control positively for steering and all other movements.

Another object of the invention is to provide a fuselage or body which will assume the lines and proportion of a motor car body, and due to the particular mechanism and control thereof, no take-off space is required. The plane may ascend in a true vertical path until it has ascended to the required altitude, which is followed by a straight course in any direction. This advantage broadens the scope of the airplane to an extent whereby it may be utilized for actual travel within the city and its various streets and thoroughfares and the commercial adaptability may equal or exceed that of the motor car for transportation facilities.

Numerous further advantages of the invention will become readily apparent during the course of the following detailed description, illustrated throughout the accompanying drawings, and more fully pointed out in the appended claims.

With reference to the drawings:

Figure 1 is a side elevation assembly of the complete fuselage or body with propellers and ready for normal use.

Figure 2 is a top plan view of the complete airplane with wing therefor broken as indicated.

Figure 3 is a greatly enlarged sectional view of one unit of the control mechanism, and taken substantially upon line 3—3 of Figure 2.

Figure 4 is an enlarged longitudinal section of the airplane taken upon line 4—4 of Figure 2.

Figure 5 is a greatly enlarged sectional view taken upon line 5—5 of Figure 2.

Figure 6 is a view taken from the position indicated by line 6—6 of Figure 5.

Figure 7 is an enlarged section of the control chain housing taken upon line 7—7 of Figure 4.

Figure 8 is a view showing one half member of the housing for the principal propeller mechanism of the invention, and likewise exposing said mechanism to view.

Figure 9 is a sectional view taken substantially upon line 9—9 of Figure 8.

Figure 10 is a sectional view of the principal propeller mechanism of the invention taken upon line 10—10 of Figure 8 and broken as indicated.

Figures 11 and 12 are sectional views of a portion of the principal propeller mechanism taken upon line 11—11 of Figure 8; said views are identical except for changed position of the elements embodied.

Figure 13 is an enlarged section taken upon line 13—13 of forth-coming Figure 14.

Figure 14 is a part section and elevation of the control mechanism and housing therefor, positioned within the body or fuselage upon the side where the door for same is located.

Figures 15 and 16 are enlarged top plan views of the principal mechanism respectively, with a portion broken away exposing changed positions of the propellers responsive to the control thereof.

Figure 17 is an enlarged section and elevation taken upon line 17—17 of Figure 2.

Figure 18 is an elevation taken from the position in Figure 17 as indicated by line 18—18.

Figure 19 is an enlarged sectional view of the propeller control mechanism taken substantially upon line 19—19 of Figure 3.

Figure 20 is a plan section taken substantially upon line 20—20 of Figure 18.

Before we describe our invention in detail, it is to be distinctly understood that all elements of the airplane illustrated and herein described and that operate in combination with our invention, will be characterized by reference numerals with alphabetical prefix in consecutive order respectively, while the invention proper will be designated by the customary reference numerals.

The elements of the airplane not comprised in the invention proper, but operate in combination with the same are as follows:

Body or fuselage, A1; wing A2; wing supporting standards A3; windshield, A4; body or fuselage door, A5; baggage compartment door, A6; operators seat, A7; passengers seat, A8; motor cooling louvers in body of fuselage, A9; body of fuselage floor, A10; rear oscillating body or fuselage carrying wheel, B1; oscillating means in said body for wheel B1, shown at B2; there are two spaced apart front body or fuselage carrying wheels B3; that rotate with stationary connection B4 with body A1. The motor or power plant is shown at C1; motor fuel tank, C2; fuel line C3; motor exhaust line C4; motor clutch, not shown in the drawings. A trap door may be provided in floor A10, for motor C1 facilities, but not shown in the drawings. Body or fuselage A1 is suggestive for the purpose, however the invention may be advantageously used for any type of body consistent with the particular requirements. Likewise motor C1, being illustrated as of the horizontal opposed type, may be of any suitable type for the purpose.

The major portion and structure of our invention, and what is principally sought for our protection is the unit within the hub of the propellers, which is clearly indicated in Figure 8 and which comprises a split housing having half portions 1 and 2 respectively. Said portions being clamped to form a complete housing for the mechanism, by a plurality of cap screws 3, with a similar number of aperatures in portion 2 and threaded apertures in portion 1 for this purpose.

The mechanism within the complete housing just described will accommodate three blades, said blades having body 4 which is secured to one end of spindle 5, and it is noted that said body is provided with semi-circular depressed recess 6 which is adapted to receive tube 7, and spindle 5 passing entirely through said tube and the exposed end of said shaft secured to body 4 as aforesaid. The opposite end of tube 7 is secured to housing members 1 and 2 at the parting line of said members and is made integral with the same. The opposite end portion of spindle 5 extends within housing members 1 and 2 with thrust bearings 8 therefor as indicated. This end of said spindle is square as at 9 and engages one end of the link or short lever 10. The opposite end of the link or short lever 10 is pivotally secured to one end of long lever 11 by means of roller 12 secured to long lever 11 by screw 13, and said roller rotatable within elongated slot 14 within the link or short lever 10 as shown. The opposite end of long lever 11 is pivotally connected to boss 15 of housing member 1 by means of shouldered stud 16. Also where indicated, roller 17 is secured to long lever 11 by means of shouldered stud 18. Propeller blade control drum 19 is provided within the principal split housing, and has a circumferentially arranged curved passage or cam slot 20, with rollers 17 of long lever 11 rotatable within said passage.

Propeller shaft 21 is keyed to the principal housing at 22 as indicated, also annular bearing 23 where shown. Said shaft also being journaled in bushing 24 and said bushing being integral with propeller blade control drum 19 and movable within hub 25.

It is understood that propeller blade bodies 4 are spaced at 120 degrees apart, relative to the principal split housing of the device.

In order to facilitate the assembling and likewise the unassembling of the propeller shaft line it is arranged in two pair of shafts, accommodating the four propellers respectively. This will be clearly observed in Figure 5, which is a sectional view upon line 5—5 of Figure 2. Special casting 26 is provided and is secured to body or fuselage A1, with propeller shaft 21 journaled in bushing 24 and said bushing being movable in said casting, for purpose that will be explained later.

The inner end of propeller shafts 21 are splined as at 27 and are adapted to engage similar splined passage in sprocket wheel 28, which engages vertically disposed chain 29, and said chain in turn engaging sprocket wheel 30 upon shaft 31, also an additional sprocket wheel (not shown), upon shaft 31 to engage chain 32, which in turn engages double sprocket wheel 33 upon chrankshaft C5 of motor C1, and with special reference to Figure 4, it is observed that the method of driving both front and rear pairs of propellers is identical and from the same source of power. A suitable motor clutch is not shown.

Again referring to Figure 5, housing 34 is provided and is secured to instrument rear panels A11 respectively, of body or fuselage A1, also annular bearings 35 within cup 36 in said housing as indicated An important part of our invention is the mechanism for controlling the blades of the propellers and likewise controlling the entire steering and maneuvering of the airplane, and with particular reference to Figures 3, 4, 14 and 19, and it is observed in Figure 19 that sprocket wheel 37 is secured to bushing 24, also vertical plate 38 connected to said bushing and to body A1. Sprocket wheel 37 engages chain 39 which connects with similar sprocket wheel 39A and is likewise secured to bushing 24A of the rear unit of the propeller shaft lines of the device. Referring to Figure 4 it is observed that elongated housing 40 is provided to accommodate chain 39 and is connected to body A1. It is to be understood that two complete control units as indicated in Figure 19 are provided within the front portion of body A1, and the unit for the right side of said body as shown in Figure 4 will control all propellers upon this side of the body, while a similar unit positioned within the front portion of said body and at the left side thereof will likewise control all propellers upon this side of the body. In view of the door A5 housing for chain 39 of the left side unit for the control is deflected as at 40A in Figure 14 also idlers 41 where shown.

Again referring to Figures 3 and 19, and as previously explained, sprocket wheel 37 is secured to bushing 24. Manually operated lever 42 is provided, which is pivotally secured to segment 43 by screw 44. Lever 42 is provided with semi-circular end portion having radial teeth 45 which are adapted to engage similar teeth upon partial gear 46 and said gear connected to bushing 24 by key 47 as indicated. Screw 48 is provided to retain partial gear 46 in the relation to the control unit as shown in Figure 19. Also radial bearing 46A where shown.

Segment 43 is connected to plate 38 and to housing 40 by screws 49 as in Figure 19.

Again referring to lever 42, oscillating member 50 is pivotally secured to the same as at 51, and one end of said member being formed so as to engage teeth 52 of segment 43 and the engagement of these elements made effective by spring 53 intermediate lever 42 and member 50. It is understood that by manually closing the handle portion of said member with the similar portion of said lever, member 50 will be disengaged from segment 43 in order to change position of lever 42 for the purpose of which will be presently explained.

The complete details of construction of our invention having been fully set forth, an explanation of the precise operation and advantages thereof immediately follows:—

It is understood that split housing has half members 1 and 2 and that the three propeller blades are supported by the said complete housing so that the housing will form a substantial hub for the blades which are spaced at intervals of 120 degrees relative to the housing. All of the blades being operatively related to the mechanism within the housing, an important advantage of our invention is that body 4 of two of the blades will be truly vertical in relation to the housing, while the third blade will be at right angle to the housing, as clearly seen in Figure 1. The positions of body 4 of the blades just described will at all times remain in the same relation, consequently when the airplane is in operation and the propellers are likewise rotating, the aforesaid third propeller blade body will drive against the air for approximately one half revolution of the propeller, and by virtue of propeller blade control drum 19 with circumferentially arranged cam slot 20 therein, and body 4 being operatively related to said slot with coordinate elements thereof, as previously explained, at the completion of the driving stroke of said body, the same is instantly turned to a position same as that of the two propellers just described. In this manner one of the blades will at all times be in the act of driving and the remaining two blades will be forced through the air edgewise, as the propeller is rotated.

As each of the bodies 4 turn upon their axis in one direction, from one position to another, after completing approximately one half revolution, the body then turns upon its axis in a similar manner and in the opposite direction. This reversible action of said bodies is for the purpose of effecting such proper angles of the same in relation to the hub of the propeller as required for practical adaptability of the propeller for the purpose.

An important advantage of our invention is the mechanism for controlling the propeller blades, that we have scientifically arranged in such a complete manner that the airplane is steered as well as being maneuvered for all purposes. By likewise eliminating the necessity of a special steering apparatus, the operation of the airplane under our system is greatly simplified, thereby broadening the utility of the airplane for unlimited purposes.

With reference to Figure 3, lever 42 will control all propellers upon one side of the airplane, and likewise govern the interval when the axial turning point of body 4 of the propeller blades takes place, both from a stand and when the airplane is in operation. This is accomplished in the following manner:

When lever 42 is moved in either direction it is released from segment 43 through member 50 and likewise reengages the segment to any predetermined position desired. At the interval when lever 42 is moved in either direction, drum 19 being movable in the principal housing, is simultaneously moved with said lever, directly due to teeth 45 of said lever engaging similar teeth upon partial gear 46, and this gear being secured to bushing 24, and this bushing being movable in hub 25 and casting 26, and is also integral with drum 19. This arrangement of course is understood to control the forward propeller upon the side of body A1 corresponding to the control therefor. In order to control the rear propeller upon this side of the said body, sprocket wheel 37 being secured to bushing 24, is connected with similar sprocket wheel 37A by means of chain 39 with housing 40 therefore as in Figure 4. Sprocket wheel 37A being connected to bushing 24A as in Figure 17.

It is further understood that an additional complete control unit as indicated in Figures 3 and 19, is provided and is positioned upon the left side of the forward interior of body A1. This unit which is identical with the one just described, will control the forward and rear propellers upon the left side of body A1, and with the same construction and operation of the former unit, with the exception of chain 39, which of necessity must be deflected as in Figure 14, in order to avoid any interruption in the manipulation of body door A5. It is also noted that special housing 40A and idlers 41 are provided to accommodate chain 39 upon this side of the said body.

It is obviously understood that while we have herein described and illustrated, one precise embodiment of our invention, we desire the privilege of making minor changes in the details of construction or in the design thereof, if this condition presents itself during any probable further development for the market, however in any eventuality, a departure from the general principle as described and claimed, particularly with respect to the principal mechanism shown in Figure 8, would of course be consistently avoided.

Having thus described our invention, what we claim as new is:

1. In a propeller structure, a rotatable shaft, a hub forming housing keyed on the shaft, radially extending blades including spindles journaled in said housing, a drum encircling the shaft in the housing and provided with a circumferential cam slot, a pair of links for each blade, each pair of links being pivotally connected together at one end, one link of each pair being pivotally connected to the housing, the complementary link being fixedly connected to the respective spindle, a roller carried by the first mentioned link for movement in said cam slot whereby the blades will rotate with respect to the housing during the rotation of the shaft.

2. In a propeller structure, a rotatable shaft, a hub forming housing keyed thereon, radially extending blades including spindles journaled in said housing, a drum encircling the shaft in said housing and provided with a circumferential cam slot, a pair of links for each blade, the links of each pair being pivotally connected at one end, one link of each pair being pivotally connected to the housing, the complementary link being fixedly connected to the respective spindle, a roller carried by the first mentioned link for movement in said cam slot, whereby the blades will rotate with respect to the housing during the rotation of the shaft, said drum being capable of rotation independently of the shaft, and manually controlled means for moving the drum whereby the feathering of the blades is timed at different points in the plane of revolution.

3. In a propeller structure, a rotatable shaft, a hub forming housing keyed thereon, a series of radially disposed blades including spindles journaled in said housing, a drum encircling the shaft within the housing and provided with a circumferential cam slot, a series of levers pivotally connected at one end to the housing, links operatively connecting the inner ends of the spindles with the respective levers, and a roller on each lever operable in the cam slot, whereby the blades will rotate with respect to the housing during the rotation of the shaft.

4. In a propeller structure, a rotatable shaft, a hub forming housing keyed thereon, a series of radially disposed blades including spindles journaled in said housing, a drum encircling the shaft within the housing and provided with a circumferential cam slot, a series of levers pivotally connected at one end to the housing, links operatively connecting the inner ends of the spindles with the respective levers, a roller on each lever operable in the cam slot, whereby the blades will rotate with respect to the housing during the rotation of the shaft, said drum being capable of rotation around the shaft, and means for actuating the drum whereby the feathering of the blades is timed at different points in the plane of revolution.

5. In a propeller structure, a rotatable shaft, a hub forming housing keyed thereon, a series of radially disposed blades including spindles journaled in said housing, a drum encircling the shaft within the housing and provided with a circumferential cam slot, a series of levers pivotally connected at one end to the housing, links operatively connecting the inner ends of the spindles with the respective levers, a roller on each lever operable in the cam slot, whereby the blades will rotate with respect to the housing during the rotation of the shaft, said drum being capable of rotation independently of the shaft, a sleeve extending axially from the drum around the shaft outwardly of the housing, and manually controlled means for rotating the sleeve and the drum whereby the feathering of the blades is timed at different points in the plane of revolution.

6. In a propeller structure, a rotatable shaft, a hub forming housing keyed thereon, a series of radially disposed blades including spindles journaled in said housing, a drum having a circumferential cam slot encircling the shaft and disposed within the housing, a lever for each spindle pivotally connected at its outer end to the interior of the housing, a link rigidly secured to the inner end of each spindle, a pin and slot connection between each link and the inner end of the complementary lever and a roller carried by the intermediate portion of each lever for movement in the cam slot, whereby the blades will rotate with respect to the housing during the rotation of the shaft.

7. In a propeller structure, a rotatable shaft, a hub forming housing keyed thereon, a series of radially disposed blades including spindles journaled in said housing, a drum having a circumferential cam slot encircling the shaft and disposed within the housing, a lever for each spindle pivotally connected at its outer end to the interior of the housing, a link rigidly secured to the inner end of each spindle, a pin and slot connection between each link and the inner end of the complementary lever, a roller carried by the intermediate portion of each lever for movement in the cam slot, whereby the blades will rotate with respect to the housing during the rotation of the shaft, said drum being capable of rotation independently of the shaft, and means for actuating the drum, whereby the feathering of the blades is timed at different points in the plane of revolution.

8. In a propeller structure, a rotatable shaft, a hub forming housing keyed thereon, a series of radially disposed blades including spindles journaled in said housing, a drum having a circumferential cam slot encircling the shaft and disposed within the housing, a lever for each spindle pivotally connected at its outer end to the interior of the housing, a link rigidly secured to the inner end of each spindle, a pin and slot connection between each link and the inner end of the complementary lever, a roller carried by the intermediate portion of each lever for movement in the cam slot, whereby the blades will rotate with respect to the housing during the rotation of the shaft, said drum being capable of rotation independently of the shaft, means for actuating the drum, whereby the feathering of the blades is timed at different points in the plane of revolution, and additional means for holding the drum in any predetermined adjusted position.

9. In a propeller structure, a split housing, a rotatable shaft extending through the housing and being keyed thereto, a series of radially disposed blades including spindles journaled in the housing, the inner end of each spindle being non-circular in cross section, a drum having a circumferential cam slot encircling the shaft and disposed within the housing, a lever for each spindle, bosses formed on the interior of the housing, the outer ends of said levers being pivotally connected to the respective bosses, a link for each spindle, the inner end of each link being constructed complementary to the non-circular inner end of each spindle for connection therewith, a pin and slot connection between the outer end of each link and the inner end of the complementary lever, a roller carried by the intermediate portion of each lever for movement in the cam slot, whereby the blades will rotate with respect to the housing during the rotation of the shaft, said drum being capable of rotation independently of the shaft, a sleeve extending from one end of the drum through the housing around said shaft, manually controlled means for rotating the sleeve and the drum, whereby the feathering of the blade is timed at different points in the plane of revolution, and means for holding the sleeve and drum in any predetermined rotatably adjusted position.

FRANK L. SZAFRANSKI.
JOHN ROGOZYNSKI.